April 27, 1971    M. D. KOCHERGINSKY ET AL    3,576,678
ALKALINE GALVANIC CELL

Filed Feb. 24, 1969    3 Sheets-Sheet 1

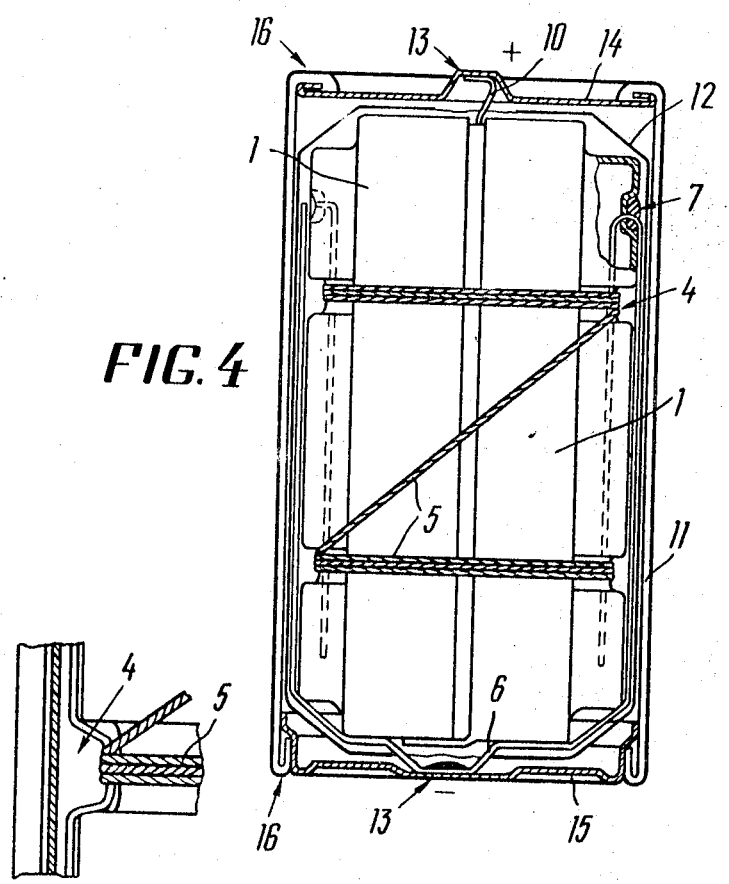
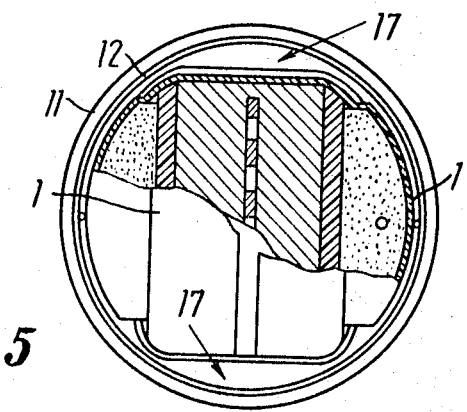

United States Patent Office 3,576,678
Patented Apr. 27, 1971

3,576,678
ALKALINE GALVANIC CELL
Meer Danilovich Kocherginsky, Ul. Komarova 6, kv. 23, Moscow, U.S.S.R.; Sergei Leonidovich Kalachev, St. Taininskaya, 1 Kalininskay per 6-a, Moskovskaya, Oblasti, U.S.S.R.; and Lidia Fedorovna Penkova, 3 Mytischinskaya, ul. 14-a, kv. 124, and Viktor Arsenievich Naumenko, Novoslobodskaya ul. 62, kv. 64, both of Moscow, U.S.S.R.; and Kasym Nurullovich Gilmanov, Ul. A, Gaiterovoi 14, Elets Lipetskoi Oblasti, U.S.S.R.
Filed Feb. 24, 1969, Ser. No. 801,448
Claims priority, application U.S.S.R., Apr. 29, 1968, 1,235,791
Int. Cl. H01m 21/00
U.S. Cl. 136—107                                6 Claims

ABSTRACT OF THE DISCLOSURE

An alkaline flat-type cylindrical galvanic cell of a manganese-zinc system comprises electrodes arranged in parallel to each other in two plastic envelopes whose portions accommodate negative cylindrical electrodes. The envelopes are drawn together by a bandage and include masses and as a result said galvanic cell has a substantially cylindrical shape. The galvanic cell is made without sealing elements and the galvanic cell outer casing is made of paper.

---

The present invention relates to chemical sources of current, and more particularly it concerns galvanic cells of the manganese-zinc system.

Known in the prior art are galvanic or primary cells filled with an alkaline electrolyte, comprising two shallow-bottom plastic envelopes accommodating negative electrodes separated by means of diaphragms from a positive electrode.

A disadvantage of the prior-art galvanic cell consists in its rather small capacity in a case where it is made according to cylindrical shape.

An object of the present invention is to eliminate the above-said disadvantage.

The principal object of the invention is to provide a galvanic or primary cell of cylindrical shape featuring a great capacity combined with an increased preservation time.

This object is achieved owing to the fact that in the alkaline galvanic cell comprising two envelopes constituted of a plastic material and accommodating negative electrodes separated from the positive electrode by means of diaphragms according to the invention, the portions of the envelopes adjoining the negative electrodes are made cylindrical, whereas the cell itself, on being clamped or drawn together, is given a substantially cylindrical shape.

To clamp or to draw the cells together, the envelopes should be provided with slots accommodating a bandage.

The galvanic cells of the proposed design are capable of operating for a period of time by as much as 3 to 3.5 times longer than that of the conventional cylindrical cells.

Thus, the proposed alkaline galvanic or primary cell made according to the dimensions of a cell, which has been designated as R-20 (in accordance with the IEC standard), is capable of operating for more than 60 hours with a 5-ohm discharge, whereas the existing cell of the R-20 type operates only for 20 hours according to this duty.

The proposed galvanic cell is simple as to its design, dependable in operation, and may be extensively used in transistor radio receivers, flashlights, electric apparatus, etc. There are recently being manufactured scores of billions of the R-20 type galvanic cells a year.

The nature of the present invention will further be made more fully apparent from a consideration of the following description of its exemplary embodiments, taken in conjunction with the accompanying drawings, in which:

FIG. 4 shows the cells assembled into a battery and enclosed in a casing;

FIG. 5 shows a transverse cross-sectional view of the assembly of FIG. 4;

FIG. 6 represents a sub-assembly intended for securing the element by means of a bandage according to the invention;

Figure 3:
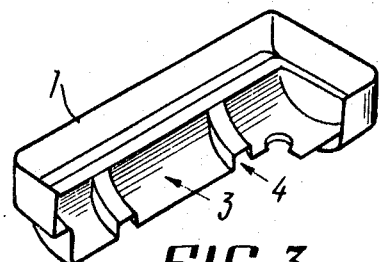
FIG. 3 is an axonometric view of the plastic body of the galvanic cell according to the invention.
Figure 1:
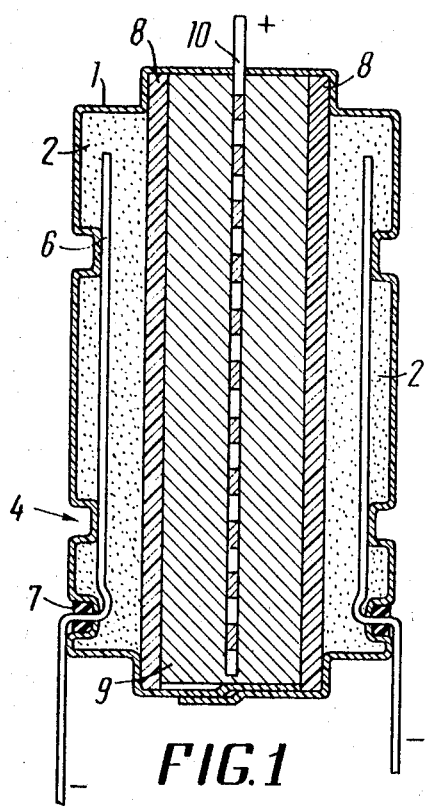
FIG. 1 represents a longitudinal cross-sectional view of the alkaline galvanic cell according to the invention.

As it will be apparent from FIG. 1, the alkaline galvanic cell is composed of two plastic envelopes 1. Placed on the bottom of each envelope 1 are negative powder zinc electrodes 2, with the portions 3 of the envelopes 1 adjoining the negative electrodes 2 being made cylindrical and having annular slots 4 accommodating bandages 5 therein (FIGS. 4, 5 and 6), the said bandages intended for clamping or securing the cell together and imparting to it a cylindrical shape.

Figure 2:
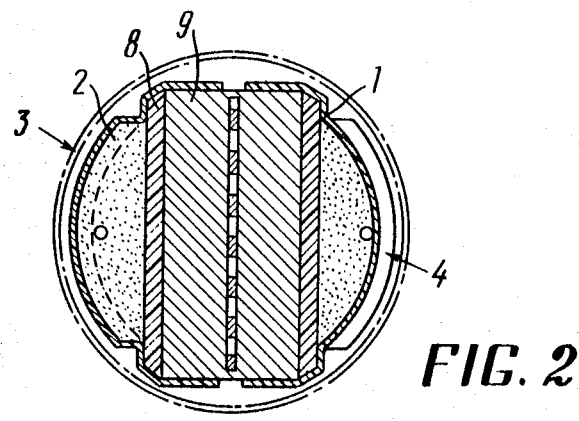
FIG. 2 is a transverse cross-sectional view of the alkaline galvanic cell according to the invention.

Located inside the negative electrodes 2 (FIGS. 1, 2) are negative current leads 6 to be insulated at the output from the envelopes 1 by means of a compound 7. Placed on the negative powder zinc electrodes 2 are diaphragms 8, between which there are provided the positive electrode 9 complete with a positive current lead 10. The clamping effected by the aid of the bandage 5 (FIGS. 4 and 6) ensures a dependable contact between the negative electrodes 2, diaphragms 8 and positive electrode 9.

The cell can be clamped or drawn together by the aid of a casing 11 (FIG. 4), for which purpose the total thickness of the negative electrodes 2, diaphragms 8 and the positive electrode 9 will have to be adopted by as much as 0.2 to 0.5 mm. greater than the internal dimension of the casing 11. In ths case, owing to the clamping of the diaphragms 8 when inserting the cell into the casing 11 there is obtained a dependable contact between the portions of the cell.

However, the use of the cell is ensured by providing annular slots 4 (FIGS. 1, 2 and 3, 4 and 6) with the bandage 5 disposed therein, as the projections formed by the slots 4 allow the negative current leads 6 to be situated in the middle of the active mass of the negative electrode 2 (FIG. 1), thus improving its opertaion when manufactured to the maximum overall dimensions.

The envelopes 1 (FIGS. 4 and 5) complete with the assembled electrodes are placed into a plastic casing 12 made, for example, of a polyethylene film, which is hermetically welded together with the exception of points 13 of output of the current leads 6 and 10. Welding or brazing is employed to connect these current leads at point 13 to the upper and lower covers 14 and 15.

Thereafter, the cell enclosed in the plastic casing 12 is to be put into a paper sheath 11 which is rolled up at points 16 so as to be secured to the covers 14 and 15.

As it appears from FIG. 5, formed between the envelopes 1 and casing 11 of the cell are air chambers 17 providing for expansion of the envelopes 1 upon the swelling of the electrode mass.

Figure 7:
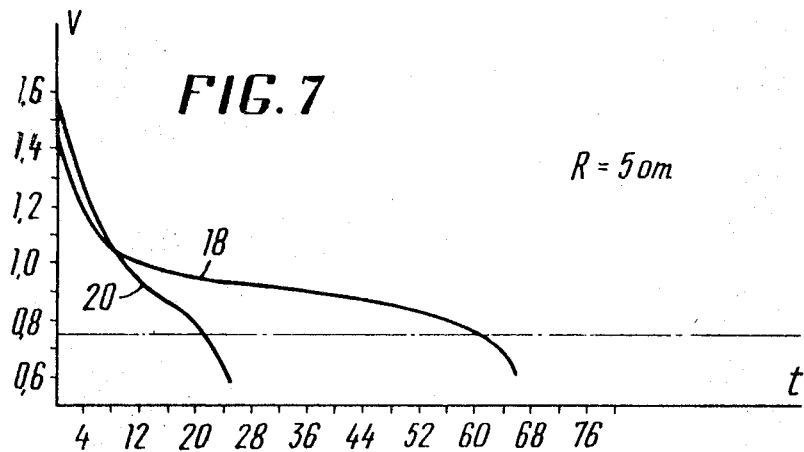
FIG. 7 is a graph showing the dependence of the voltage of the proposed cells on the time of discharge as compared with the existing cells made in dimensions according to the R-20 type and operating at a resistance of 5 ohms.
Figure 8:
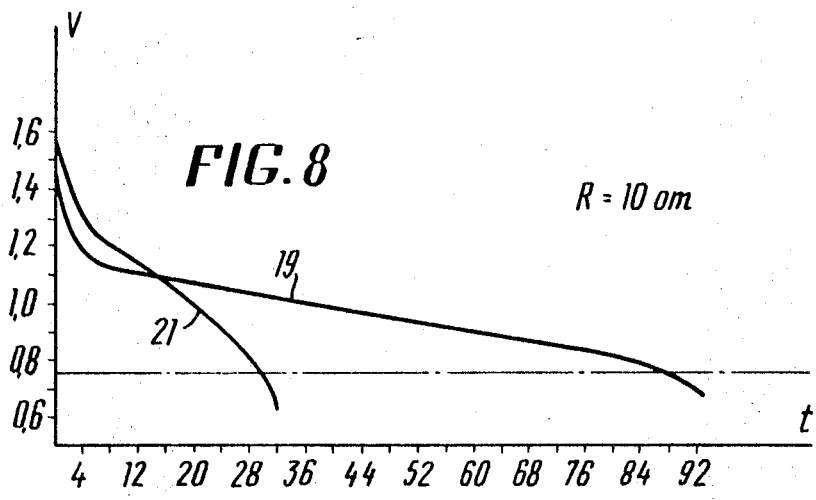
FIG. 8 is a graph similar to that in FIG. 7 when the assembly is operated at a resistance of 10 ohms.

The operating efficiency of the proposed cell is by as much as 3 to 3.5 times greater than that of the conventional galvanic cells made to the R-20 type overall dimensions, which is confirmed by graphs (FIGS. 7 and 8) illustrating the dependence of voltage on the time of discharge when operating at resistances of 5 to 10 ohms. The discharge at a resistance of 5 ohms was carried into effect for 30 minutes a day, whereas the discharge at a resistance of 10 ohms required 4 hours a day. On the drawings, lines 18 and 19 indicate the discharge of the proposed cell, whereas lines 20 and 21, indictae the discharge of the existing cells.

It will be obvious that the present invention is not limited by the galvanic cell made to the dimensions according to R-20. The cylindrical cells of the manganese-zinc system embodied according to the present invention, may be manufactured according to any overall dimensions desired.

It is also possible to provide cells featuring a positive electrode for air depolarization. In this case, the capacitance of the cells manufactured to the R-20 type overall dimensions will be equal to at least 20 amp-hours.

What we claim is:

1. An alkaline galvanic dry cell comprising two plastic envelopes, each of said plastic envelopes including an open portion, means for supporting said plastic envelopes opposite one another with respective open portions facing one another in opposing relation, two negative electrodes, each of said negative electrodes being supported respectively in a respective one of said plastic envelopes, two negative current leads, each of said negative current leads including a portion embedded respectively in a respective one of said negative electrodes and a portion protruding through a respective one of said envelopes, a positive electrode interposed between said two negative electrodes, a positive current lead including a portion embedded in said positive electrode and a portion projecting outwardly therefrom, and two diaphragms interposed respectively between said positive electrode and a respective one of said negative electrodes, each of said diaphragms on opposite sides thereof contacting one of said negative electrode and said positive electrode respectively, said portions of said negative current leads protruding through said envelopes being connected to one another externally of said envelopes.

2. A dry cell as claimed in claim 1 wherein said envelopes are each partially cylindrical and are joined together to constitute a cylindrical dry cell.

3. A dry cell as claimed in claim 2 wherein said envelopes are each provided with a plurality of corresponding annular slots, and wherein said means for supporting said envelopes opposite one another are bandages seated in said slots.

4. A dry cell as claimed in claim 3 wherein said positive electrode and said diaphragms are each substantially rectangular in cross-section and said negative electrodes are each partially cylindrical in cross-section.

5. A dry cell as claimed in claim 4 including a cylindrical casing surrounding said envelopes.

6. A dry cell as claimed in claim 5 wherein said casing is plastic and includes longitudinally opposite end covers, said negative electrodes being connected to one of said opposite end covers, and said positive electrode being connected to the other of said opposite end covers.

References Cited
UNITED STATES PATENTS

| | | | |
|---|---|---|---|
| 1,064,210 | 6/1913 | Heil | 136—166 |
| 2,671,125 | 3/1954 | Heraud | 136—132 |
| 3,332,802 | 7/1967 | Clune et al. | 136—107 |
| 3,335,031 | 8/1967 | Kordesch | 136—107 |
| 3,393,097 | 7/1968 | Robinson et al. | 136—83 |
| 3,437,530 | 4/1969 | Anderson | 136—132 |
| 3,449,171 | 6/1969 | Knight | 136—132 |
| 3,455,738 | 7/1969 | Ruben | 136—6 |

DONALD L. WALTON, Primary Examiner

C. F. LeFEVOUR, Assistant Examiner

U.S. Cl. X.R.

136—111, 166